UNITED STATES PATENT OFFICE.

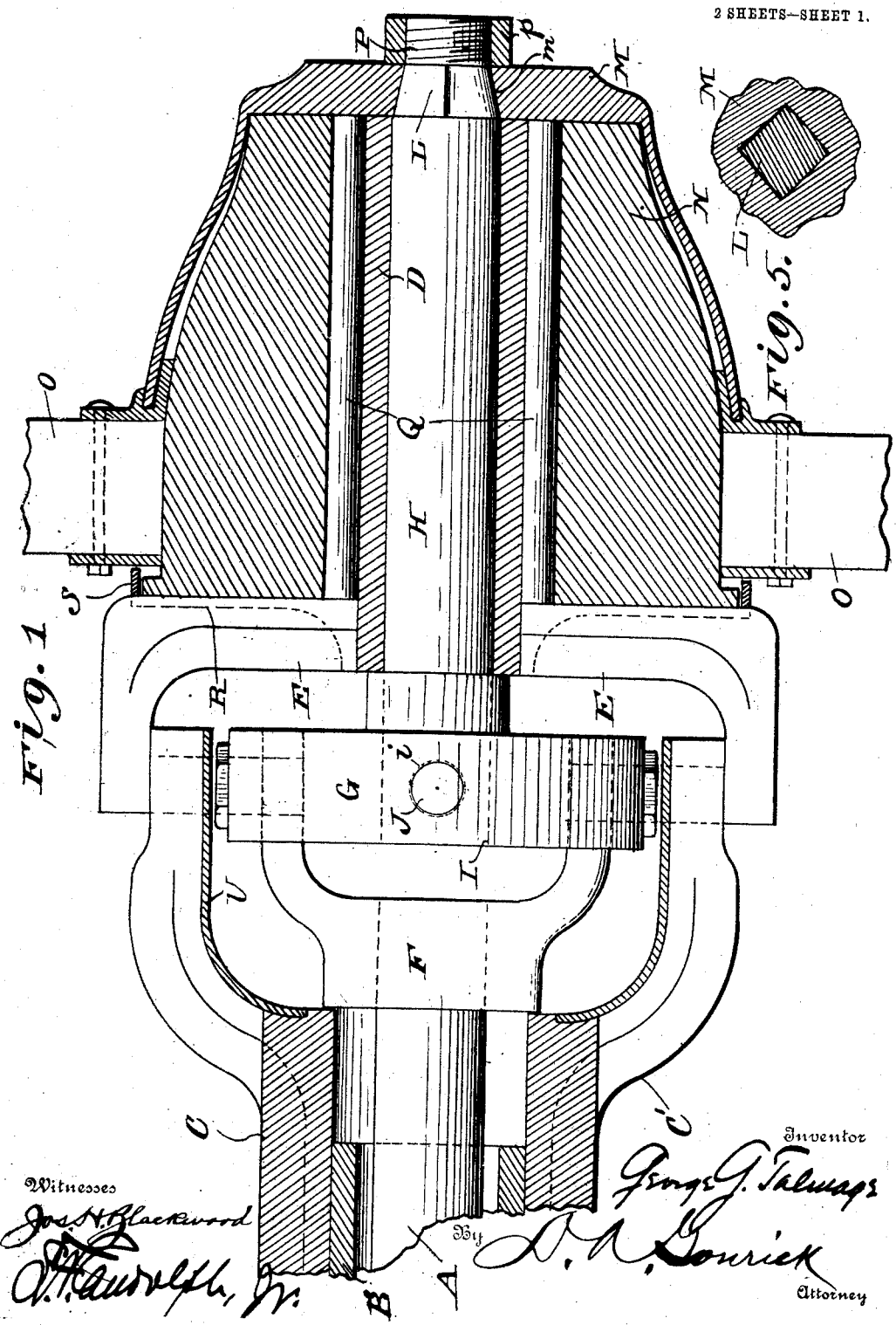

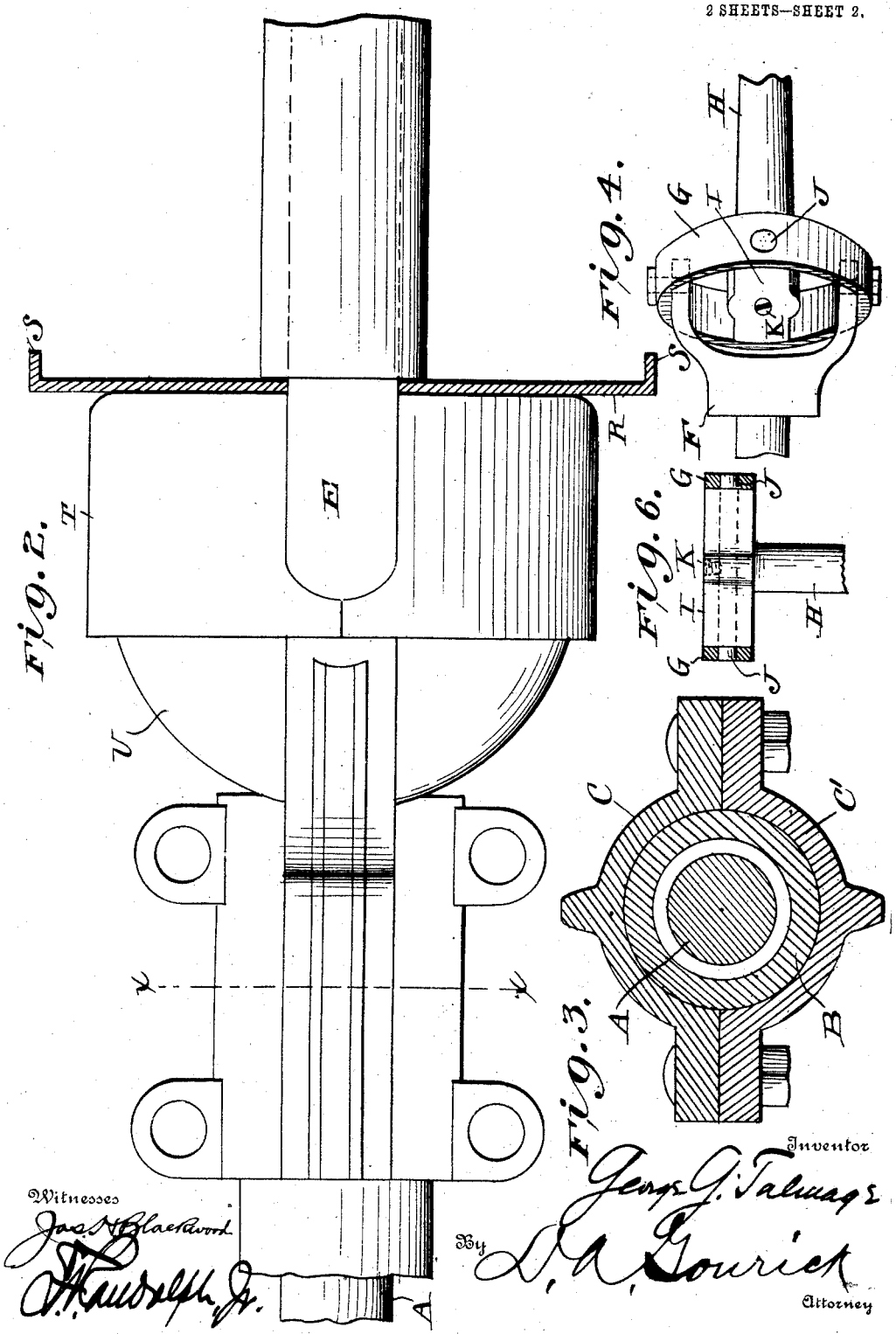

GEORGE G. TALMAGE, OF WASHTA, IOWA.

POWER-TRANSMITTING GEAR.

No. 864,708.　　　　Specification of Letters Patent.　　　　Patented Aug. 27, 1907.

Application filed November 24, 1906. Serial No. 344,972.

*To all whom it may concern:*

Be it known that I, GEORGE G. TALMAGE, a citizen of the United States, residing at Washta, in the county of Cherokee and State of Iowa, have invented certain new and useful Improvements in Power-Transmitting Gears for Motor-Vehicle Wheels, of which the following is a specification.

My invention relates to transmitting gears for the steering wheels of motor vehicles and consists in the provision of a novel construction of universal joint so as to permit swinging the wheel spindle relatively to the driving axle in turning.

My invention will be described in detail hereinafter and illustrated in the accompanying drawings in which—

Figure 1 is a side view partly in section of a fragment of the driving axle and wheel showing the universal joint and the wheel hanger, Fig. 2, a top plan view of the wheel spindle and fragment of the driven axle showing the universal joint incased, Fig. 3, a cross-section on the line x—x of Fig. 2, Fig. 4, a detail view of the universal joint and shaft fragments, and Fig. 5, a plan view of a fragment of the wheel drive shaft showing the cross-head and the universal joint ring in section. Fig. 6 is a sectional detail.

In the drawings similar reference characters indicate corresponding parts throughout the several views.

A represents the driving axle inclosed in a tubular casing B to which are secured the two members C and C′ of the wheel hanger, D indicating the axle spindle having yoke arms E pivotally secured to the two members C and C′.

The end of axle A is formed with a yoke F having its two ends pivotally secured to ring G.

H indicates the wheel drive shaft, revolubly mounted in spindle D, said shaft having a cross-head I at its inner end with a hole *i* running longitudinally of said cross-head and J represents a pin pivoting cross-head I to ring G by passing through hole *i*, said pin J being secured from displacement by means of set screw K.

The outer end of shaft H is formed with a rectangular portion L to fit a rectangular hole *m* in cap M secured to the hub N of the wheel O.

P represents a threaded portion on the end of shaft H to receive a nut *p* for holding the wheel on the shaft.

Q indicates rollers between hub N and spindle D.

R indicates a plate secured to spindle D and yoke arms E and having a lateral flange S extending over the inner end of the hub N to keep sand and other foreign matter out of the bearings Q.

T indicates a casing secured to yoke arms E, and U a casing secured to the two wheel hanger members C and C′ and fitting inside of the casing T, said casings T and U being designed to protect the universal joint, above described, from grit and other foreign substances.

It will be understood from the above description and an inspection of the drawings that my invention is designed to permit the application of power to the steering wheels of a motor vehicle the universal joint admitting of turning the wheel in any direction while power is being applied.

Having thus described my invention what I claim is—

1. A universal joint connecting two shafts comprising a ring, yoke arms extending from one of said shafts and pivotally secured to said ring, a cross-head on one end of the other shaft having a longitudinal hole therein, a pin extending through said hole and the ring, and a set screw secured in said cross-head and engaging said pin, substantially as shown and described.

2. In combination with a driving shaft, a tubular casing inclosing said shaft, wheel hangers secured to said casing, an axle spindle, yoke arms extending from said spindle and pivotally secured to said wheel hangers, a wheel hub rotatably mounted on said spindle, a shaft revolubly mounted in said spindle having its outer end formed with a rectangular portion, a cap secured to the wheel hub and having a rectangular hole to receive the rectangular portion on the shaft, and a universal joint connecting said shafts, substantially as shown and described.

3. In combination with a driving shaft having yoke arms extending therefrom, a ring pivotally secured to said yoke arms, a tubular casing inclosing said shaft, wheel hangers secured to said casing, an axle spindle, yoke arms extending from said spindle and pivotally secured to said wheel hangers, a wheel hub rotatably mounted on said spindle, a shaft revolubly mounted in said spindle having its outer end formed with a rectangular portion, a cap secured to the wheel hub and having a rectangular hole to receive the rectangular portion on the shaft, a cross-head on the inner end of the last mentioned shaft having a longitudinal hole therethrough, and a pin secured through said hole and the ring aforesaid; substantially as shown and described.

4. In combination with a driving shaft having yoke arms extending therefrom, a ring pivotally secured to said yoke arms, a tubular casing inclosing said shaft, wheel hangers secured to said tubular casing, a casing secured to said hangers, an axle spindle, yoke arms extending from said spindle and pivotally secured to said wheel hangers, a plate secured to said spindle and arms and having an outwardly extending flange, a casing secured to said arms and overlapping the casing secured to the wheel hangers aforesaid, a wheel hub rotatably mounted on the spindle and having its inner end inclosed by the flange on the plate aforesaid, a shaft revolubly mounted in said spindle having its outer end formed with a rectangular portion, a cap secured to the wheel hub and having a rectangular hole to receive said rectangular portion on the shaft, a cross-head on the inner end of the last mentioned shaft having a longitudinal hole therethrough, and a pin secured through said hole and the ring aforesaid; substantially as shown and described.

In testimony whereof I hereto affix my signature in the presence of two witnesses.

GEORGE G. TALMAGE.

Witnesses:
MALCOLM MCGREGOR,
R. O. BARNES.